Oct. 18, 1949.　　C. HOLLERITH　　2,484,888
BRAKE VALVE
Filed Sept. 20, 1946
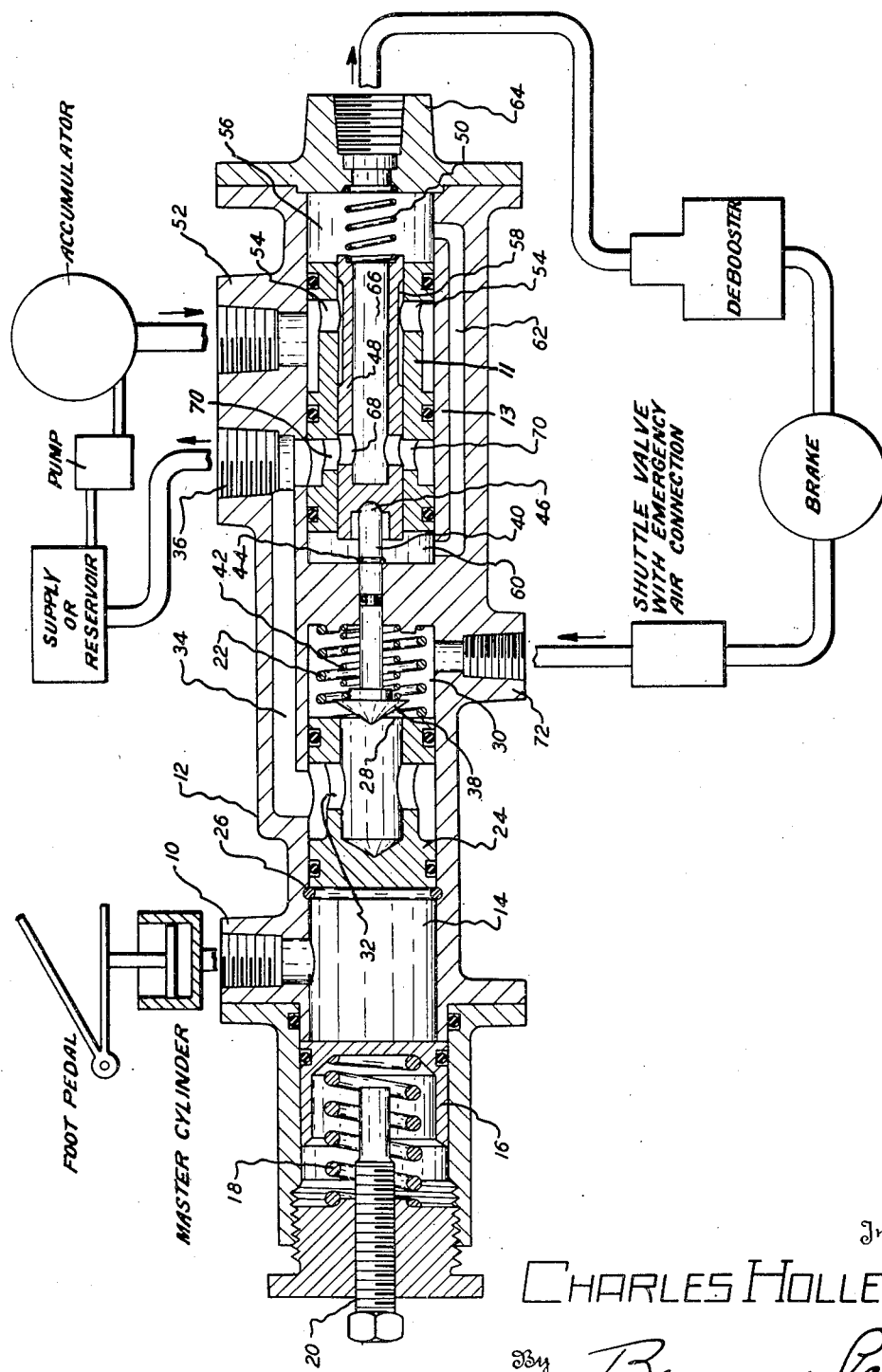
Inventor
CHARLES HOLLERITH
By Beaman & Patch
Attorneys Patented Oct. 18, 1949

2,484,888

UNITED STATES PATENT OFFICE 2,484,888

BRAKE VALVE

Charles Hollerith, Jackson, Mich., assignor, by mesne assignments, to The B. F. Goodrich Company, Akron, Ohio, a corporation of New York Application September 20, 1946, Serial No. 698,165

4 Claims. (Cl. 188—152)

The present invention relates to improvements in regulating valves for power brakes.

It is an object of the present invention to provide a valve of the type described in which the "load feel" is taken directly from the brake and therefore more closely synchronizes the actual brake application with the "load feel" at the foot pedal in the cockpit of an aircraft or other vehicle in which the brakes are remotely operated through manually energized control means.

Another object is to provide a valve of the type described in which the "load feel" is directly taken from the brakes from the low pressure side of the debooster.

A further object is to provide a valve of the type described in which the "load feel" is directly taken from the brake through a bleeder line.

A still further object of the invention is to provide a regulating valve for power brakes having a displacement chamber with a removable wall, one side of which is subjected to the pressure of the master cylinder, and the other side is in direct communication with the brake through a line independent of the pressure operating line to the brake.

These and other objects and advantages residing in the specific arrangement, combination and construction of parts will be more fully appreciated from a consideration of the following specification and appended claims.

In the drawings, a regulating valve embodying the present invention is shown in vertical cross section with the connections into the hydraulic brake system diagrammatically illustrated.

Fluid under pressure is displaced from the master cylinder through operation of the foot pedal in a well-known manner and enters the connection 10 of the regulating valve into the displacement chamber 14. To give the desired amount of travel to the foot pedal, a piston 16 is provided at one end of the chamber 14 and upon brake application moves to the left against the tension of the spring 18, with its travel determined by the adjustable abutment 20.

The spring 22 normally holds the piston valve member 24 in the position shown abutting the retainer ring 26. In this position the port 28 is opened into the chamber 30 and communicates through port 32 with the passage 34 connecting to the supply or reservoir outlet 36.

The valve part for closing port 28 comprises a head 38, a stem 40 and a spring 42 which normally urges the valve into the position shown limited by the retainer ring 44. The end 46 of the valve stem 40 abuts the piston valve 48 and normally holds the same to the right against tension of the spring 50.

High pressure fluid from an accumulator, or other source of pressure, enters the pressure inlet connection 52, passes through the ports 54 and into the chamber 56 through the port 58 upon sufficient displacement of the piston 48 to the right. To balance the valve 48 the chamber 56 is placed in fluid communication with the chamber 60 through the passage 62. The high pressure fluid flows through the pressure outlet connection 64, to the debooster and from the debooster to the brakes, all in a well-known manner.

In the position shown in the drawing, the brakes are released and return fluid from the debooster flows back through the chamber 56 through the central passage 66 of the valve 48 and out through ports 68 which are now aligned with ports 70 to be returned to the supply or reservoir through the connection 36.

The ports 54 and 70 are provided upon a stationary liner 11 fixed within the cylinder part 13 of the valve casing and sealed therein by the sealing rings shown.

The communication between the chamber 30 and the brakes may be through a fluid line attached to the connection 72 and extending directly to the brakes and entirely independent of the high pressure line attached to the connection 64. In the line attached to the connection 72, is provided a shuttle valve with an emergency air connection for operating the brakes in the event of failure of the power brakes. With the brakes in released position as indicated in the drawings, it should be apparent that the brakes may be bled through the line attached to the connection 52 through the chamber 30 and passage 34 to the supply through the connection 36.

To describe the operation in the valve 12, as the load of the spring 18 is greater than the combined loads of the springs 22, 42 and 50, displacement of the fluid into the chamber 14 will first result in the piston valve 24 moving to the right to engage with the valve 38 to close the port 28. Continued movement of the valve 24 with the port 28 closed, moves the valve 48 to the right against the tension of the spring 50. This movement closes the port 70 and brings the port 54 into fluid communication with the chamber 56. The resistance of the springs 22, 44 and 50 has now been built up to a point where further displacement of fluid in the chamber 14 will result in movement of the piston 16 to the left to give the desired amount of travel to the foot pedal connected to the master cylinder. The high pressure fluid discharged into the chamber 56 flows through the connection 64 to the debooster to apply the brakes.

As the valve 48 is balanced, the pressure build-up in the chamber 56 when the brakes are applied is not transferred back to the piston 24, and thence to the foot pedal as the "load feel." Such an arrangement would give a "load feel" at the foot pedal in advance of the actual application of the brakes. To avoid this, the "load feel" is transmitted to the piston valve 24 through the auxiliary line attached to the connection 72. The pressure build-up in the brakes at the time of brake application is directed into the chamber 30 reacting against the piston 24. As the valve head 38 is held to its seat with the port 28, it is capable of movement independently of the valve 48. In this manner the "load feel" in the brake pedal is substantially synchronized with actual brake application.

Having thus described my invention, what I claim as new and desire to cover by Letters Patent is:

1. A regulating valve for power brakes for synchronizing "load feel" on brake application, said valve comprising a pressure inlet, a pressure outlet, a valve controlling the flow of pressure fluid between said inlet and said outlet, means for substantially balancing fluid pressure on said valve, a displacement chamber having a movable wall and adapted to be hydraulically connected to a source of fluid displaced into said chamber by manual actuation, an operative connection between said wall and said valve, a second chamber on the opposite side of said wall from said first chamber, and a fluid inlet for said second chamber adapted for direct connection with the brakes whereby fluid pressure in the brake is capable of reacting against said movable wall to hydraulically transmit said "load feel" into said first chamber.

2. A regulating valve for power brakes for synchronizing "load feel" on brake application comprising a pressure inlet, a pressure outlet, a valve located between said inlet and said outlet for controlling the flow of pressure fluid therethrough for applying the brakes, means for substantially balancing fluid pressure on said valve, an exhaust outlet connecting with said pressure outlet, a fluid passage therebetween controlled by said valve, a displacement chamber having a movable wall adapted to be hydraulically connected to a source of fluid displaced into said chamber by manual actuation, an operative connection between said wall and said valve to move said valve to the brake applying position, a second chamber on the opposite side of the wall from said first chamber, an inlet to said second chamber adapted to be directly connected to the brakes, an outlet from said second chamber connecting with said pressure exhaust, and a valve seat associated with said operative connection and located in said second chamber to control the flow of fluid between said inlet and outlet of said second chamber, whereby it is possible to utilize the fluid pressure at the brakes to react against said movable wall to hydraulically transmit "load feel" to said first chamber.

3. A regulating valve for power brakes for installation between a pressure source and a brake comprising a displacement chamber, a "load feel" chamber, a brake valve chamber, said chambers being co-axial, a hydraulic connection to said displacement chamber adapted for fluid connection with a master cylinder, a movable wall between said displacement chamber and said "load feel" chamber, inlet and exhaust connections in said "load feel" chamber, valve means in said "load feel" chamber controlling the flow of fluid between said inlet and exhaust, said valve means including an axially displaceable member and a member associated with said movable wall, fluid pressure, exhaust, and brake connections in said brake valve chamber, an axially displaceable valve in said brake valve chamber, connecting said brake and exhaust connections in one position and said pressure and brake connections in another position, means for substantially balancing fluid pressure on said brake valve, an operative connection between said brake valve and said axially displaceable valve member, spring means for continuously urging said first and second valve structures to pressure-exhausting positions, movement of said movable wall upon displacement of fluid in said displacement chamber closing said first valve structure and making said movable wall responsive to fluid pressure in said "load feel" chamber and operating said second valve through displacement of said member.

4. In a power brake valve system having a master cylinder with a manually-displaced wall, a source of fluid pressure, a brake, and valve mechanism located between the brake and the pressure source regulated by pressure from said master cylinder for synchronizing "load feel" with brake application, said valve mechanism comprising a brake valve chamber having pressure, brake and exhaust connections, a substantially fluid pressure balanced valve in said chamber for regulating the flow of fluid pressure between the pressure source and the brake through said connections, a "load feel" chamber having exhaust and brake connections, valve means in said "load feel" chamber, a displacement chamber having master cylinder connections, a movable wall between said displacement and "load feel" chambers, a connection between said movable wall and said valve means to close said valve means to provide brake pressure in said "load feel" chamber against said movable wall, an operative connection between said movable wall and said fluid balanced valve to direct fluid pressure to the brake, and continuously acting spring means for urging said fluid balanced valve and said valve means into position exhausting brake pressure.

CHARLES HOLLERITH.

REFERENCES CITED

The following references are of record in the file of this patent:

UNITED STATES PATENTS

| Number | Name | Date |
|---|---|---|
| 1,895,477 | McCune | Jan. 31, 1933 |
| 1,962,857 | Cash | June 12, 1934 |
| 2,133,275 | Andres et al. | Oct. 18, 1938 |
| 2,349,310 | Schnell | May 23, 1944 |
| 2,368,043 | Schnell | Jan. 23, 1945 |